United States Patent [19]

Boyd et al.

[11] Patent Number: 4,472,026

[45] Date of Patent: Sep. 18, 1984

[54] ELECTROTHERMAL MATRIX ADDRESSABLE LIQUID CRYSTAL DISPLAY

[75] Inventors: Gary D. Boyd, Rumson; Julian Cheng, Little Silver, both of N.J.

[73] Assignee: AT&T Bell Laboratories, Murray Hill, N.J.

[21] Appl. No.: 375,670

[22] Filed: May 6, 1982

[51] Int. Cl.³ .............................................. G02F 1/13
[52] U.S. Cl. .................................. 350/333; 350/346; 350/351; 350/340; 350/341
[58] Field of Search .................... 350/333, 346, 339 R, 350/340, 341, 351

[56] References Cited

U.S. PATENT DOCUMENTS

| | | | |
|---|---|---|---|
| 3,947,183 | 3/1976 | Haas et al. | 350/346 X |
| 3,967,883 | 7/1976 | Myerhofer et al. | 350/341 |
| 3,994,567 | 11/1976 | Matsuo et al. | 350/341 |
| 4,009,934 | 3/1977 | Goodwin et al. | 350/346 |
| 4,202,010 | 5/1980 | Hareng et al. | 350/351 X |
| 4,333,708 | 6/1982 | Boyd et al. | 350/346 |
| 4,400,060 | 8/1983 | Cheng | 350/339 R |

OTHER PUBLICATIONS

Cheng, J. et al., "Switching Characteristics and Threshold Properties of Electrically-Switched Nematic Liquid Crystal Bistable Configuration Devices," 1980 *Biennial Display Research Conference of IEEE* (Oct. 1980), pp. 180-182.

Thurston, R. N. et al., "Mechanically Bistable Liquid--Crystal Display Structures," *IEEE Transactions on Electron Devices*, vol. ED-27, No. 11, (Nov. 1980), pp. 2069-2080.

S. LeBerre et al., "Flat Smectic Liquid Crystal Display Panel," *Displays*, Oct. 1981, pp. 349 et seq.

M. Hareng et al., "Liquid Crystal Flat Display," *Proc. IEDM*, pp. 258 et seq., (1978).

G. D. Boyd et al., "Liquid-Crystal Orientational Bistability and Nematic Storage Effects," *Appl. Phys. Lett.* 36 (7), pp. 556-558, (1980).

J. Cheng et al., "Threshold and Switching Characteristics of a Bistable Nematic Liquid-Crystal Storage Display," *Appl. Phys. Lett.*, 37 (12), pp. 1072-1074, (1980).

J. Cheng, "Surface Pinning of Disclinations and the Stability of Bistable Nematic Storage Displays," *J. Appl. Phys.*, 52 (2), pp. 724-727, (1981).

*Primary Examiner*—John K. Corbin
*Assistant Examiner*—Richard Gallivan
*Attorney, Agent, or Firm*—Gregory C. Ranieri

[57] ABSTRACT

A row and column matrix of strip electrodes is utilized for switching bistable liquid crystal display cells from the vertical state to the horizontal state via resistive heating by applying an electric current of sufficient magnitude and duration to selected electrodes. Resistive heating causes the liquid crystal to undergo a phase transition from the nematic mesophase to an isotropic phase. Extinction of the current permits the liquid crystal to cool preferentially into the horizontal state of the nematic mesophase. Horizontal-to-vertical state switching is performed by conventional electric field effect techniques.

8 Claims, 6 Drawing Figures

ELECTROTHERMAL MATRIX ADDRESSABLE LIQUID CRYSTAL DISPLAY

TECHNICAL FIELD

This invention relates to liquid crystals and, more particularly, to liquid crystal cells for use in a display.

BACKGROUND OF THE INVENTION

For a bistable nematic liquid crystal display, state transitions (ON-to-OFF or OFF-to-ON) occur under the influence of appropriately applied dynamic electric fields. See, for example, G. Boyd et al., "Liquid-Crystal Orientational Bistability and Nematic Storage Effects," Appl. Phys. Lett. 36, pp. 556–558 (1980) and J. Cheng et al., "Threshold and Switching Characteristics of a Bistable Nematic Liquid-Crystal Storage Display," Appl. Phys. Lett. 37, pp. 1072–1074 (1981). In particular, vertical electric fields cause orientational director transitions to a predominantly vertical alignment configuration, an ON state, for example, for the liquid crystal molecules. Similarly, horizontal electric fields cause orientational director transitions to a predominantly horizontal alignment configuration, an OFF state, for example, which is topologically distinct from the vertical alignment configuration. See U.S. patent application, Ser. No. 98,976 filed on Nov. 30, 1979, U.S. Pat. No. 4,333,708.

In this bistable nematic liquid crystal medium, the horizontal and vertical electric fields are produced with an array of interdigital electrodes as a matrix addressing arrangement for activating and deactivating individual display cells. Although this type of arrangement can provide low to moderate addressing speeds for a moderate electric field strength, it is incapable, from a practical viewpoint, of providing high speed operation. In addition, interdigital electrodes require both a large number of connections per display cell and complex control circuits to activate particular electrodes for switching.

Interdigital electrodes generate nonhomogeneous electric fields and exhibit two distinct switching thresholds for liquid crystal displays, namely, a longitudinal threshold and a transverse threshold. These thresholds represent minimum electric field strengths necessary for detaching disclinations in the liquid crystal medium from boundary discontinuities in surface alignment or topography. Existence of the two separate thresholds and the creation of nonhomogeneous electric fields substantially impair the effectiveness of interdigital electrodes for high speed matrix addressing purposes in liquid crystal displays.

Homogeneous or uniform vertical electric fields can be generated by an array of orthogonally disposed, continuous uniform strip electrodes as the matrix addressing arrangement. This type of electrode arrangement facilitates transitions from the horizontal state to the vertical state, that is, OFF to ON state transitions. Furthermore, it exhibits a single sharp switching threshold for horizontal to vertical state transitions which is of sufficient magnitude and definition to assure reliable, high speed switching. However, the array of strip electrodes is unsuited for generating the fields necessary for vertical to horizontal state transitions, that is, ON to OFF state transitions.

SUMMARY OF THE INVENTION

An array of orthogonally disposed, continuous uniform strip electrodes is utilized in accordance with the present invention for high speed matrix addressable switching on a bistable nematic liquid crystal display by electrically inducing state transitions in a first direction, such as horizontal to vertical, and by electrothermally inducing state transitions in a second direction opposite to the first direction, such as vertical to horizontal. Thermal gradients resulting from the electrothermal process cause melting to occur in the liquid crystal as evidenced by a nematic-to-isotropic phase transition. Upon reaching a clearing threshold temperature (isotropic phase), the liquid crystal is allowed to cool and assume the proper state required for completing the state transition in the second direction.

In an embodiment of this invention, a reverse tilt boundary condition is imposed on substrate and electrode surfaces adjacent to the liquid crystal material at a display cell. Matrix addressing is performed by an array of row and column electrodes. Column electrodes in the array are employed for data entry in a writing cycle, whereas row electrodes are utilized both for scanning during writing cycles and for resistive heating during erasure cycles.

BRIEF DESCRIPTION OF THE DRAWINGS

A more complete understanding of the invention may be obtained by reading the following description of a specific illustrative embodiment of the invention in conjunction with the appended drawings in which.

DETAILED DESCRIPTION

A storage display is simply envisioned as a plurality of selectively energizable cells separated from each other by neutral isolation regions. In accordance with the present invention, this display structure is developed completly within the framework of a liquid crystal material substantially in the nematic mesophase disposed between two substrates. An array of electrodes is contained on opposite substrates to provide switching energy to the individual cells via matrix addressing, that is, time-multiplexed row and column addressing.

Liquid crystal material in each cell is capable of assuming either of two stable ordered states of nearly equal energy and has disclinations at the cell boundaries. A state is characterized by a particular configuration of orientational directors for the liquid crystal material. This is described mathematically by the existence of two different solutions of an equilibrium equation for the same set of physically defined cell boundary conditions. For simplicity, the two states are called horizontal and vertical alluding to the alignment of a substantial fraction of the directors in the bulk of the liquid crystal material comprising a cell. To avoid confusion, although a vertical twisted state also exists in the nematic mesophase, it is understood to be covered by the description relating to the vertical state. Interstate switching is accomplished under the influence of an applied energy field which causes detachment and motion of disclinations at the affected cell or cells. See, for example, the previously cited publications of J. Cheng et al. and G. D. Boyd et al. Also, with reference to the teachings on bistable nematic liquid crystal displays, the material in U.S. patent application Ser. No. 98,976, filed Nov. 30, 1979, U.S. Pat. No. 4,333,708, by G. D. Boyd et al., is expressly incorporated herein.

As stated above, neutral isolation regions separate adjacent cells from one another. Neutral isolation regions are volumes of liquid crystal material which maintain a fixed orientational director configuration when adjacent bistable cells assume either of the two stable ordered states. These regions surround individual cells in order to separate, isolate and stabilize the cells of the display device. A theory of neutral isolation regions is explained by J. Cheng in "Surface Pinning of Disclinations and the Stability of Bistable Nematic Storage Displays," J. Appl. Phys. 52, pp. 724–727 (1981). Also, in this regard, the material contained in U.S. patent application Ser. No. 252,148, filed Apr. 8, 1981, U.S. Pat. No. 4,400,060, by J. Cheng entitled "Cell Isolation in Bistable Nematic Liquid Crystal Cells," is expressly incorporated herein.

Figure 1:
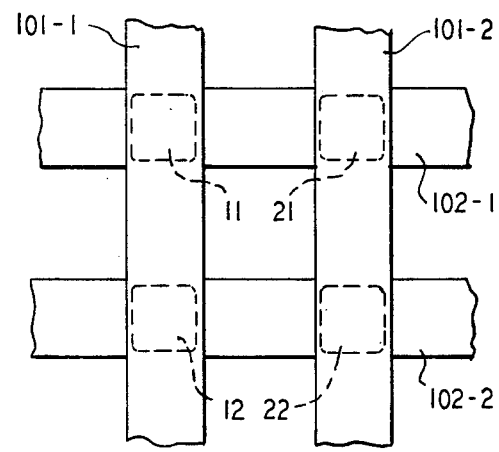
FIG. 1 shows an embodiment for an array of uniform elongate strip electrodes for matrix addressing individual cells of a liquid crystal display.

FIG. 1 shows a portion array of uniform strip electrodes forming a 2×2 matrix. Electrode arrays of this type are suitable for matrix addressing each cell of the four cells in the liquid crystal display. Although the portion of the array shown contains only four cells, it is clearly understood by those skilled in the art that the array can be of any dimension and shape, such as m×n where m≦n.

Two orthogonally disposed, spaced-apart sets of strip electrodes are shown in FIG. 1. For illustrative purposes, one set of electrodes comprises two vertical or column electrodes 101-1 and 101-2, whereas the other set of electrodes comprises two horizontal or row electrodes 102-1 and 102-2.

The two sets of electrodes define four cells, namely, cells 11, 12, 21 and 22, at the respective overlap regions of the row and column electrodes. For example, one such overlap region at cell 21 is bounded by directly opposed facing portions of electrodes 101-2 and 102-1. In one specific illustrative embodiment, the cross-sectional area of such a cell is about 800 μm by 840 μm, wherein row electrodes 101-1 and 102-2 are each approximately 800 μm wide and column electrodes 101-1 and 101-2 are each approximately 850 μm wide. Transparent metallic films such as indium tin oxide are utilized for making row and column electrodes in a transmission mode display.

When the electrode array of FIG. 1 is integrated into a liquid crystal display, selective energization of the row and column electrodes is used for controlling the respective states of individual cells. Conventional row and column selection circuits (not shown) and a standard master control circuit (not shown) are adaptable for connection to the electrodes in order to address individual cells. An exemplary arrangement of these circuits is disclosed in U.S. Pat. No. 4,072,937 issued to W. Chu on Feb. 7, 1978, which disclosure is expressly incorporated herein.

The selection circuits generally apply an alternating current signal to the electrodes wherein the signal has an associated voltage level above or below a particular threshold level. It is preferred that the voltage across a particular selected cell be much larger than the voltage across any nonselected pel in order to avoid spurious or accidental switching of the nonselected cells. To this end, techniques known as 3:1 or 2:1 addressing are used for data entry during writing cycles.

In 3:1 addressing, the voltage at a selected cell is three times greater than the voltage across a nonselected cell. Assume, for example, that it is desired to select cell 21 for a state transition, that is, the area defined by the overlap of electrodes 101-2 and 102-1. Select and nonselect AC signals for application to the various electrodes are described as follows: row select signals exhibit a level of −V volts; row nonselect signals exhibit a level of +V volts; column select (data entry) signals exhibit a level of +2 V volts; and column nonselect signals exhibit a level of 0 volts. In this notation, a minus (−) signed signal indicates a 180 degree phase difference with respect to a positive (+) signed signal. To select cell 21, nonselect signals are applied to row electrode 102-2 and to column electrode 101-1 and select signals are applied to row electrode 102-1 and to column electrode 101-2. Hence, cell 21 is impressed with a vertical electric potential of +3 V volts, whereas cells 11, 12 and 22 are impressed vertical electric potentials of −V, +V and +V volts, respectively.

As stated above, this exemplary technique is useful for data entry (writing). However, a different technique is required for erasure of data at selected cells. It is this technique and the means for carrying it out which will be discussed in relation to FIGS. 2 through 6.

Figure 2:
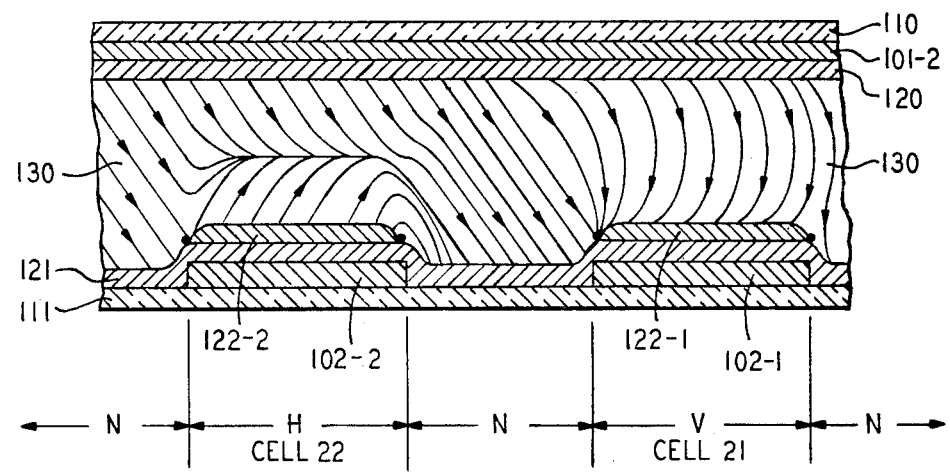
FIG. 2 shows a cross-sectional view of a liquid crystal display with the electrode array of FIG. 1 having one cell in a horizontal stable configuration and a second cell in a vertical stable configuration.

FIG. 2 shows a cross-sectional view of a portion of a liquid crystal display which incorporates the electrode array of FIG. 1. The cross-section cuts through and parallel to column electrode 101-2 exposing portions of cells 21 and 22. In particular, the portion of the display shown in FIG. 2 includes column electrode 101-2, row electrodes 102-1 and 102-2, substrates 110 and 111, topographically textured tilt alignment surfaces 120, 121, 122-1 and 122-2, and nematic liquid crystal material 130. Additionally, specific regions are demarcated below the cross-section to identify configurations of liquid crystal material 130 such as horizontal (H) and vertical (V) states and neutral (N) isolation regions. The display shown in FIGS. 2 through 6 may be operated in the transmission or reflection mode. For operation in the latter mode, a suitable reflector (not shown in the Figures) is added to the display in a straightforward manner.

Substrates 110 and 111 support the electrode array as well as provide a means for containing liquid crystal material 130. The substrates are composed primarily of a transparent dielectric material such as silicon dioxide or glass, for example.

Thin film conductive strips are deposited or etched by conventional photolithographic techniques on an inner surface of each substrate to form continuous uniform elongate strip electrodes as shown in FIG. 1. Column electrodes 101-2 (not shown in FIG. 2) and 101-2 are formed on the inner surface of substrate 110. Likewise, row electrodes 102-1 and 102-2 are formed on the inner surface of substrate 111. For a transmission mode display, these electrodes are substantially transparent and are comprised of indium tin oxide, for example. Substantially opaque electrodes, such as aluminum, are used in a reflective mode display. Dimensionally, the electrodes have a thickness in the range 300 to 2000 angstroms and a width of approximately 800 μm (row electrodes 102-1 and 102-2) to 850 μm (column electrodes 101-1 and 101-2). For the dimensions stated above, row electrodes 102-1 and 102-2 exhibit a thin film resistance of about 70Ω/□. Thin film resistance of the row electrodes is important to the electrothermal erasure cycle and is recommended to be in the range of 10Ω/□ to 2000Ω/□. The electrothermal erasure cycle is described below in more detail with respect to FIGS. 3 through 6.

Tilt alignment surfaces 120 and 121 are transparent, obliquely deposited oxides on the exposed inner surfaces and electrodes of substrates 110 and 111, respectively, for defining surface alignment of liquid crystal material 130. Oblique electron beam deposition or thermal evaporation of a metallic compound, such as titanium oxide or silicon oxide, deposited at 85 degrees from normal, results in a uniformly tilted columnar topography for the tilt alignment surface. This topography defines a surface tilt angle $\theta_0$ from the normal of the substrate to the tiled metallic columns, preferably, in the range 22.5 degrees to 67.5 degrees.

Tilt alignment surfaces 122-1 and 122-2 are deposited substantially over row electrodes 102-1 and 102-2, respectively, by oblique deposition of an oxide layer together with conventional photolithographic masking and etching for location and shaping of the surfaces. Reverse tilt occurs because deposition of surfaces 122-1 and 122-2 is performed at a complementary (reflective) angle to that used for surface 121 to result in an oppositely tilted surface alignment to the alignment of surface 121, that is, a surface tilt angle of $-\theta_0$ from the substrate normal for surfaces 122-1 and 122-2 rather than $+\theta_0$ from the substrate normal for surfaces 120 and 121. Hence, there exists an orientational discontinuity, $\delta$, along the edges of surfaces 122-1 and 122-2 at the respective interfaces with surface 121. The orientational discontinuities are shown in FIGS. 2 through 6 as darkened circular areas and are defined in terms of the surface tilt angle $\theta_0$ as, $$d = \begin{cases} 2\theta_0, \text{ or} \\ \pi - 2\theta_0 \end{cases}$$

It is preferred for stable disclination pinning that the discontinuity be in the range 45 degrees to 135 degrees and, preferably, at 90 degrees. The overall tilt alignment geometry shown in FIG. 2 is generally called a reverse tilt alignment which coincides with the apparent tilt angles on opposite facing surfaces in electrode overlap areas such as at cells 21, 22, etc.

Liquid crystal material 130 is a mixture of a nematic liquid crystal substance with a dye material for optical differentiation of the various states. With each sample of material 130 is associated a particular clearing point temperature, $T_c$, which defines the temperature at which a nematic to isotropic phase change occurs. The clearing point temperature is generally $\Delta T$ degrees above an ambient temperature for the nematic mesophase. Cyanobiphenyl samples (E7 from Merck Chemical Company) doped with 0.5 to 2 percent pheochroic dye (D5 from Merck Chemical Company) have been placed, in an illustrative example, between substrates 110 and 111 with a substrate surface to substrate surface separation of 10 to 50 μm and, more typically, 20 μm. Optical contrast is viewed by placing a single polarizer adjacent to an outer surface of substrate 111 (observer at outer surface of substrate 110) and by orienting the polarization direction of the polarizer to be parallel to column electrodes 101-1 and 101-2.

As shown in FIG. 2, liquid crystal material 130 has assumed vertical (V) state at cell 21, the overlap of row electrode 102-1 and column electrode 101-2, a horizontal (H) state at cell 22, the overlap of row electrode 102-2 and column electrode 101-2, and neutral configurations elsewhere. Application of a vertical electric field of sufficient strength, that is, exceeding a switching threshold, between column electrode 101-2 and row electrode 102-1 can cause cell 21 to be in the vertical state shown. Matrix addressing, as described in relation to FIG. 1, is one illustrative technique capable of causing the configuration shown in FIG. 2 provided that at least cell 22 is assumed to be in the horizontal state before addressing and data entry begins and, further, that $+3$ V volts is greater than a switching threshold and $+V$ volts is less than the threshold. As stated above, strip electrodes are desirable for electrically inducing horizontal-to-vertical state transitions (OFF to ON) used during writing cycles for data entry. However, strip electrodes are ineffective for generating homogeneous transverse electric fields to electrically induce a reverse transition, that is, a vertical-to-horizontal state transition (ON to OFF), during each erasure cycle.

Uniform strip electrodes and, in particular, row electrodes 102-1 and 102-2 are utilized in accordance with the invention to erase displayed data by electrothermally inducing state transitions to the horizontal state. Row electrodes 102-1 and 102-2 respond to an appropriate electrical signal to generate thermal gradients in liquid crystal material 130 adjacent to each row electrode and, thereby, heat material 130 locally to a temperature above a clearing point temperature such that material 130 undergoes a nematic-to-isotropic phase transition. After the clearing point temperature is attained in the bulk of each cell to be erased, the electrical signal is removed from row electrodes 102-1 and 102-2 to allow liquid crystal material 130 to cool. From the isotropic phase, liquid crystal material 130 cools preferentially into the ordered horizontal state of the nematic mesophase. This preference for an ordered state is determined by the surface tilt angle ($\theta_0$) and discontinuity ($\delta$) of tilt alignment surfaces 120, 122-1 and 122-2 which cause the horizontal state to have a lower elastic energy than the vertical state. Furthermore, the preference for the horizontal state is unaffected by the homogeneity or nonhomogeneity of nucleation along a nematic/isotropic interface. This will be discussed in more detail below.

FIGS. 3 through 6 show the behavior of liquid crystal material 130 during the heating and preferential cooling interval of an erasure cycle, as described generally above. Throughout these figures, it is assumed that nucleation occurs homogeneously along the nematic/isotropic interface. It is clear that, in a complete erasure cycle, liquid crystal material 130 is heated from an ordered state of the nematic mesophase and cooled to an ordered state of the nematic mesophase. Hence, erasure is conducted without requiring disclination movement, because of the nematic/isotropic phase transition.

Figure 3:
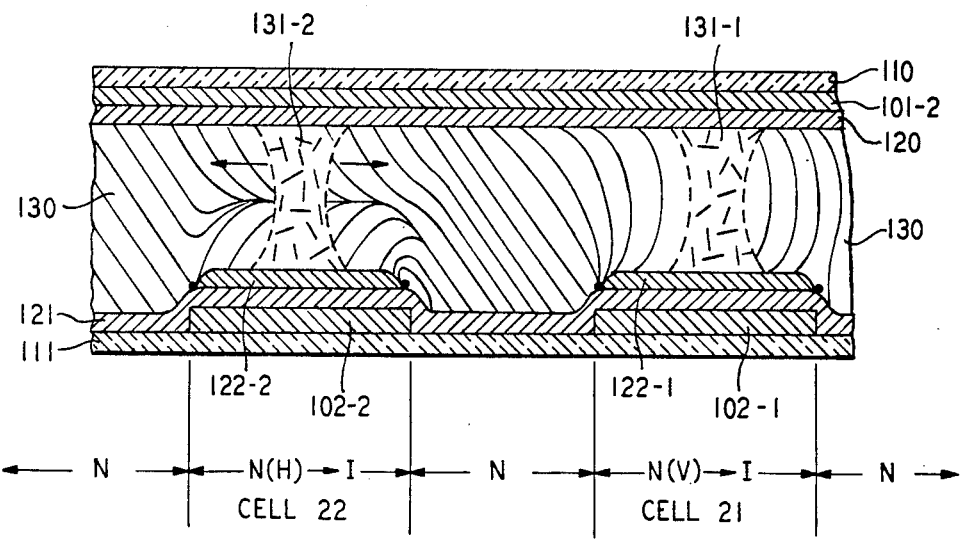
FIGS. 3-6 show sequential cross-sectional views of the display in FIG. 2 undergoing electrothermal erasure of displayed data in accordance with the principles of this invention.

FIG. 3 shows changes of liquid crystal material 130 after an erase electrical signal has been applied to row electrodes 102-1 and 102-2 in order to initiate erasure of data stored at all pels over either of the row electrodes. In this instance, data at cells 11, 12, 21 and 22 are to be erased.

The erase electrical signal which initiates electrothermal erasure of data exhibits a current magnitude and pulse duration, in a particular relationship, to cause thermal gradients of sufficient magnitude in material 130 that the liquid crystal material is elevated to a temperature at or above a clearing point temperature. A low current (~68 ma) and long pulse duration (~100 msec.) produces broad, horizontal thermal gradients which cause the type of phase transition shown in FIG. 3. A high current and short pulse duration (~10 msec.) for the erase signal creates narrow, vertical thermal gradients which give rise to nonhomogeneous nucleation of the nematic phase in material 130.

As shown in FIG. 3, when the erase signal is being applied to row electrodes 102-1 and 102-2, material 130 adjacent to the activated row electrodes is heated by an electrothermal process. Diffusion transports thermal energy through liquid crystal material 130 toward alignment surface 120. The flow of thermal energy defined by the thermal gradients causes nematic liquid crystal material 130 to melt. In turn, isotropic regions 131-1 and 131-2 form above electrodes 102-1 and 102-2, respectively. Cell 21 above row electrode 102-1 is shown undergoing a nematic phase (vertical state) to isotropic phase (N(V)→I) transition. Similarly, cell 22 above row electrode 102-2 is shown undergoing a nematic phase (horizontal state) to isotropic phase (N(H)→I) transition.

Figure 4:
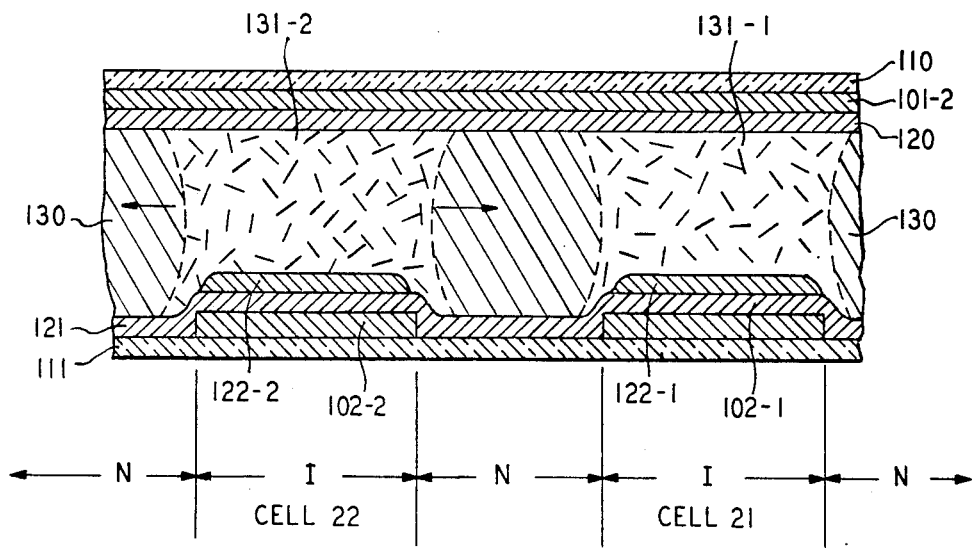

Isotropic regions 131-1 and 131-2 continue to expand (direction of arrows in FIGS. 3 and 4) beyond the lateral boundaries of the respective row electrodes while the erase signal subsists. FIG. 4 shows this expansion of isotropic regions 131-1 and 131-2 when the clearing point temperature is attained and the nematic to isotropic phase transition is completed at cells 21 and 22. It is important to note that the isotropic regions extend beyond the orientational discontinuities (darkened circles) at each row electrode to ensure a proper erasure upon cooling material 130. That is, heating of the liquid crystal material during erasure must be sufficient to eliminate the pinning disclinations at each cell to be erased.

Figure 5:
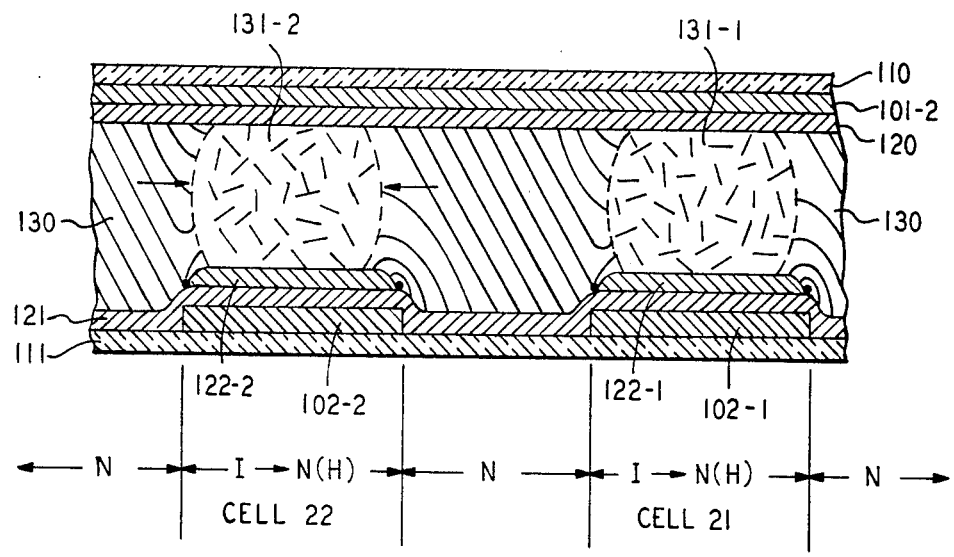

After liquid crystal material 130 has been heated above the clearing point temperature, the erase signal is extinguished at row electrodes 102-1 and 102-2 to allow preferential cooling to begin. FIG. 5 shows the cooling process shortly after extinction of the erase signal. Isotropic to nematic phase (horizontal state) transitions (I→N(H)) occur above each previously activated row electrode. Because of the broad, horizontal thermal gradients in liquid crystal material 130, nucleation occurs homogeneously along each nematic/isotropic interface (dashed lines in FIGS. 3–6) and thereby give rise to uniform formation of the ordered horizontal state of the nematic mesophase as the isotropic regions contract (see direction of arrows). Were the thermal gradients narrow and vertical, transition to the isotropic phase would occur rapidly and nucleation would occur nonhomogeneously and would thereby give rise to a mixture of horizontal and vertical state domains in the nematic phase. This mixture of domains preferentially relaxes into the horizontal state after a brief time period called "dead time", approximately 1-2 seconds in duration.

It is possible to reduce the relaxation period exhibited in nonhomogeneous nucleation by cooling the liquid crystal material in the presence of an electric field applied between the row and column electrodes. In this case, the liquid crystal material should exhibit a two frequency relaxation behavior. That is, for the applied electric field at frequency f Hz, the liquid crystal material exhibits positive dielectric anisotropy ($\Delta\epsilon > 0$) for $f < f_c$ or negative dielectric anisotropy ($\Delta\epsilon < 0$) for $f > f_c$, where $f_c$ is the characteristic crossover frequency of the material. In the embodiment shown in the Figures, an electric field at frequency $f > f_c(\Delta\epsilon < 0)$ is impressed between the substrates by applying an ac electrical signal to both the row electrodes and the column electrodes after extinction of the erase signal on the row electrodes. This particular field causes liquid crystal material 130 to have negative dielectric anisotropy. The signal is applied after the isotropic phase is reached so that the field is present during the cooling portion of the erase cycle. Presence of such a vertical electric field will cause liquid crystal material 130 to be biased to relax into the horizontal configuration, i.e., an alignment configuration perpendicular to the applied field, rather than nucleating into both horizontal and vertical domains. Of course, application of an electric field during the cooling period (isotropic to nematic phase transition) is necessary only when the erasure signals are high current, short duration pulses which cause rapid heating and nonhomogeneous nucleation of the liquid crystal material.

Figure 6:
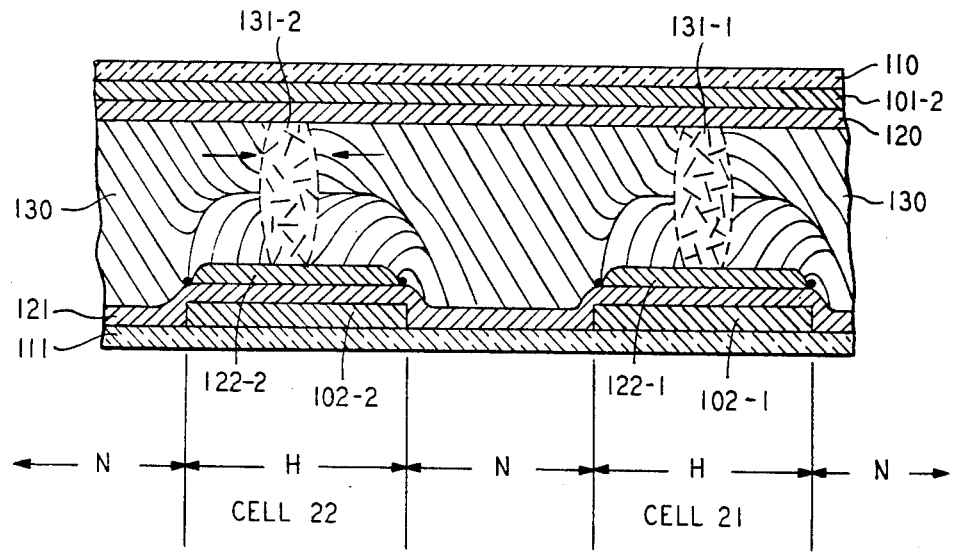

As cooling continues, isotropic regions 131-1 and 131-2 contract, leaving behind an ordered state of the nematic mesophase in liquid crystal material 130. The ordered state shown in FIG. 6 is horizontal because of the lower elastic energy in this state as compared to the vertical state. After full contraction, isotropic regions 131-1 and 131-2 vanish and thereby complete the erasure cycle with cells 21 and 22 in the horizontal state.

It is important to mention several characteristics of the erase signal which are important for complete erasure. The erase signal has a power density, power per unit area, during its duration ($t_e$) sufficient to achieve a temperature change $\Delta T$ in material 130 above the clearing point temperature. Power density varies linearly with $\Delta T$ and inversely with $t_e^{\frac{1}{2}}$. The current or voltage, therefore, varies as $t_e^{-\frac{1}{4}}$. For an erase signal of 68 ma and duration, $t_e = 100$ msec. and electrode type and dimension described above, the power density of the signal is 0.44 0/mm² in order to achieve a temperature change, $\Delta T = 40$ degrees C., above the ambient temperature of the sample (E7 and D5) of material 130. The erase signal may be any type of gated alternating current signal at any frequency, preferably, several kilohertz, to avoid space charge polarization effects in liquid crystal material 130.

Erasing speed is determined by the thermal diffusion length or cell thickness, d, and diffusivity, k, of the display, as follows, $$\tau = \frac{d^2}{2K}$$

where $\tau$ is the diffusion time. Diffusivities in the range $10^{-4}$ to $10^{-3}$ cm²/sec and a cell thickness of 10 μm where each cell is exposed to local heating, heating primarily of the liquid crystal material rather than the substrates, result in erasure cycles in the range $10^{-3}$ to $10^{-2}$ sec. Therefore, it is apparent that the electrothermal matrix addressable liquid crystal display is capable of high speed operation.

Defects at the interior surfaces of a cell can seriously affect switching operation of the defective cell. In order to overcome this potential problem, surfaces 122-1 and 122-2 can be divided at each cell into a plurality of subcells. The subcells are separated from each other by isolation regions. In this manner, defects in a cell are localized to affect the operation of only one or several of the subcells but not inhibit operation of the entire cell. Therefore, the defective cell is still capable of being switched from one state to another. In one example, it has been determined that each cell is divisible into a 9×17 matrix array of subcells having dimensions 30 μm×50 μm and separated by 20 μm isolation regions. The reverse tilt geometry is seen at each subcell.

It has been found that, for certain substrate configurations, it is preferable to add some liquid crystal material in the cholesteric mesophase to the nematic material in order to properly bias the bulk orientational configuration with a homogeneous twist chirality, thereby preventing the impairment of optical properties by the existence of mixed chirality twist domains and twist walls.

An alternative row and column matrix strip electrode arrangement is realized by defining an annular geometry for each electrode at every cell. With this arrangement, erasing may be performed, as described above, by heating and melting the liquid crystal material around the perimeter of each cell where disclinations are pinned. Localized heating at the cell perimeter produces an isotropic region defined by the annular shape of the electrode. This destroys prior data displayed by the cell because it erases any prior memory of the disclinations pinned at the boundary by detaching the disclinations therefrom. Once detached, the disclinations are observed as a loop which undergoes self-propelled shrinkage provided that the loop has propagated a sufficient distance from the point of detachment to avoid reattachment, such as a distance comparable to the cell thickness, d. Annular geometry strip electrodes of the type described hereinabove are fabricated from either opaque or transparent films regardless of the mode of the display, either transmission mode or reflection mode.

What is claimed is:

1. Display apparatus comprising
   first and second substrates,
   a liquid crystal material in the nematic mesophase having orientational directors disposed between both of the substrates,
   an interior surface of each of the substrates being configured to align the orientational directors in a predetermined pattern at each interior surface,
   writing means responsive to a first supplied electrical signal for generating an electric field between the substrates to align the orientational directors of at least one selected area of the liquid crystal material in a first ordered state, and
   erasing means responsive to a second supplied electrical signal for heating at least one selected area of the liquid crystal material to a predetermined temperature at or about a clearing point temperature in order that a phase transition from the nematic mesophase to the isotropic phase is effected in the liquid crystal material
   the interior surface of the first substrate and the interior surface of the second substrate have deposited thereon respective topographically textured layers of a metallic compound to form a reverse tilt alignment geometry for restricting the liquid crystal material in the isotropic phase to cool preferentially into only a second ordered state of the nematic mesophase.

2. The display apparatus defined in claim 1 wherein a surface tilt angle $\theta_0$ on each topographically textured metallic layer of the substrates is in the range from 22.5 degrees to 67.5 degrees, inclusively.

3. The display apparatus defined in claim 2 wherein the writing means comprises first and second pluralities of uniform elongate strip conductors arranged on the first and second substrates, respectively, the conductors of the first plurality being disposed substantially perpendicular to the conductors of the second plurality.

4. The display apparatus defined in claim 3 wherein the erasing means comprises the second plurality of uniform elongate strip conductors.

5. The display apparatus defined in claim 4 wherein the liquid crystal material has a two frequency relaxation characteristic adapted to cause negative dielectric anisotropy in the liquid crystal material for an applied electric field above a particular frequency, and the erasing means includes relaxation biasing means responsive to a third supplied electrical signal for generating an electric field at the particular frequency between the substrates to align the orientational directors of at least one selected area of the liquid crystal material in the second ordered state.

6. The display apparatus defined in claim 5 wherein the relaxation biasing means comprises the first and second plurality of conductors.

7. The display apparatus defined in claim 4 or claim 6 wherein said liquid crystal material includes a pleochroic dye.

8. The display apparatus defined in claim 7 wherein said liquid crystal material includes liquid crystal material in the cholesteric mesophase.

* * * * *